United States Patent
Forster

(10) Patent No.: US 9,436,904 B2
(45) Date of Patent: Sep. 6, 2016

(54) ROBUST WASHABLE TAGS USING A LARGE AREA ANTENNA CONDUCTOR

(71) Applicant: Avery Dennison Corporation, Mentor, OH (US)

(72) Inventor: Ian James Forster, Essex (GB)

(73) Assignee: Avery Dennison Retail Information Services, LLC, Westborough, MA (US)

( * ) Notice: Subject to any disclaimer, the term of this patent is extended or adjusted under 35 U.S.C. 154(b) by 0 days.

(21) Appl. No.: 14/313,427

(22) Filed: Jun. 24, 2014

(65) Prior Publication Data

US 2016/0019452 A1    Jan. 21, 2016

Related U.S. Application Data

(60) Provisional application No. 61/838,668, filed on Jun. 24, 2013.

(51) Int. Cl.
| | | |
|---|---|---|
| *G06K 19/06* | (2006.01) | |
| *G06K 19/077* | (2006.01) | |
| *H01Q 13/10* | (2006.01) | |
| *H01Q 1/22* | (2006.01) | |
| *H01Q 7/00* | (2006.01) | |
| *H01Q 1/27* | (2006.01) | |

(52) U.S. Cl.
CPC ... *G06K 19/07777* (2013.01); *G06K 19/07728* (2013.01); *G06K 19/07749* (2013.01); *G06K 19/07762* (2013.01); *H01Q 1/2225* (2013.01); *H01Q 7/00* (2013.01); *H01Q 13/10* (2013.01); *H01Q 1/273* (2013.01)

(58) Field of Classification Search
USPC ........... 235/492, 451, 487; 340/572.1, 572.7, 340/572.8
See application file for complete search history.

(56) References Cited

U.S. PATENT DOCUMENTS

| | | | | |
|---|---|---|---|---|
| 7,298,330 | B2* | 11/2007 | Forster | G06K 19/07749 |
| | | | | 343/700 MS |
| 7,298,343 | B2* | 11/2007 | Forster | G06K 19/07749 |
| | | | | 343/700 MS |
| 8,072,334 | B2 | 12/2011 | Forster | |
| 8,164,529 | B2* | 4/2012 | Parsche | H01Q 7/005 |
| | | | | 343/741 |

(Continued)

FOREIGN PATENT DOCUMENTS

EP    2161785 A1    3/2010

OTHER PUBLICATIONS

International Search Report dated Oct. 7, 2014 for International Application No. PCT/US2014/043867 filed Jun. 24, 2014.

(Continued)

*Primary Examiner* — Ahshik Kim
(74) *Attorney, Agent, or Firm* — Avery Dennison Retail Information Services, LLC

(57) ABSTRACT

Robust merchandise tags, patches, inlays and labels are provided for mounting on garments, fabrics, apparel accessories and other flexible merchandising materials. These are robust enough to withstand processing during manufacturing, including steps such as machine washing, stone washing and chemical treatments, while being capable of remaining on the garment, fabric or the like during inventory handling, merchandising and consumer use. The robust merchandise tags combine a hybrid-slot loop antenna structure with an uncharacteristically large area conductor sheet in the nature of a foil or the like. Overlaminations and fold-over portions also can be included for robustness enhancement.

20 Claims, 10 Drawing Sheets

(56) References Cited

U.S. PATENT DOCUMENTS

2009/0201157 A1    8/2009   Forster
2012/0050011 A1    3/2012   Forster
2012/0241521 A1*   9/2012   Kim .................... H01Q 1/2225
                                                          235/492

OTHER PUBLICATIONS

International Preliminary Report on Patentability and Written Opinion dated Dec. 29, 2015 for International Application No. PCT/US2014/043867 filed Jun. 24, 2014.

* cited by examiner

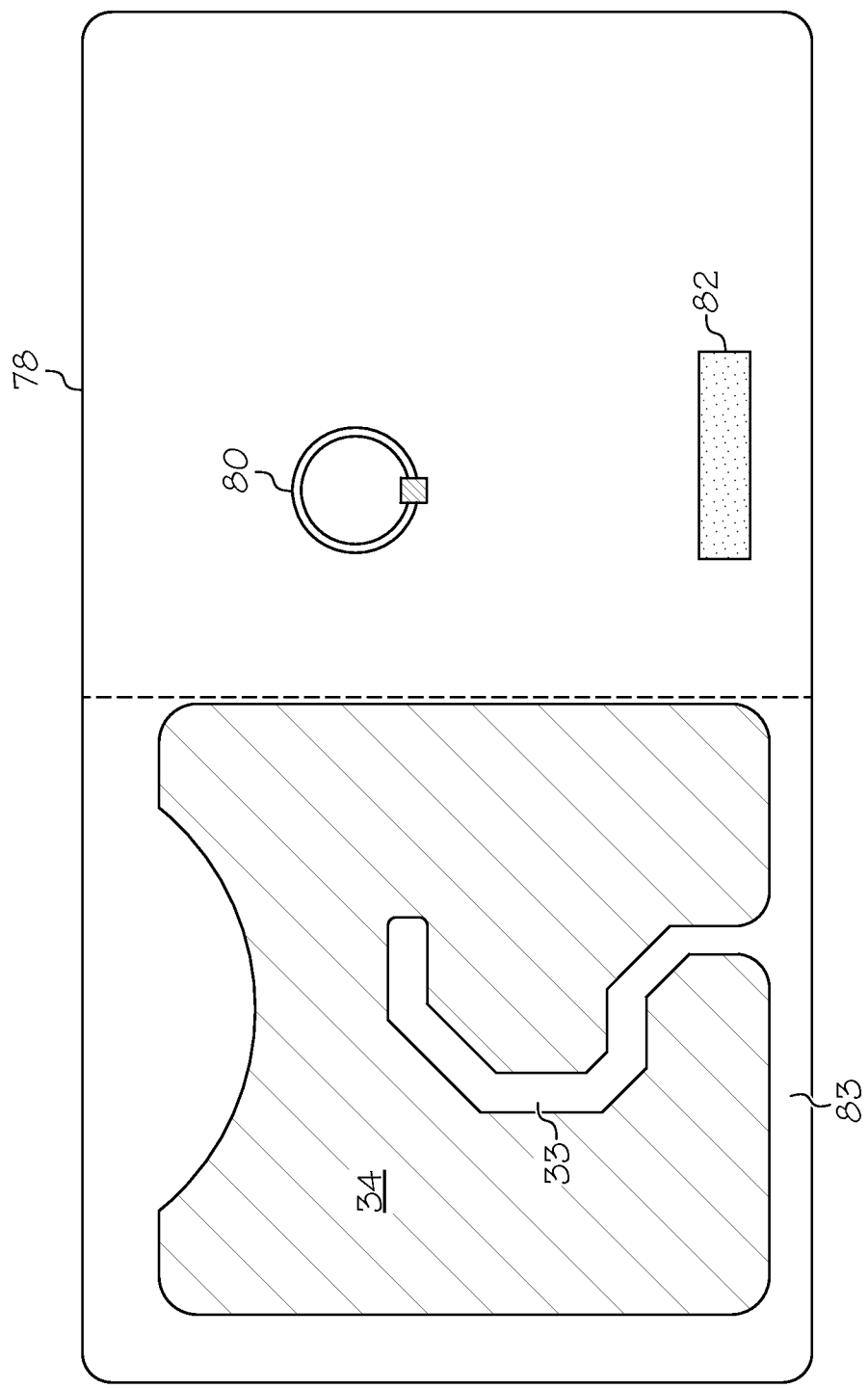

ROBUST WASHABLE TAGS USING A LARGE AREA ANTENNA CONDUCTOR

CROSS-REFERENCE TO RELATED APPLICATION

The present application claims priority of U.S. Application No. 61/838,668 filed Jun. 24, 2013 which is incorporated herein by reference in its entirety.

BACKGROUND

1. Field of the Disclosure

The present subject matter relates to tags, for example those used in merchandising or retailing applications. More particularly, the present subject matter relates to antennae assemblies employing wireless communication approaches such as radio frequency identification ("RFID") technology useful in the context of consumer goods production, processing and merchandising, as well providing services to the end user of the item by functioning as a security and/or identification tag in the form of an identification label, patch, decorative component or the like and especially suitable for clothing and which may be used for inventory, security, compliance and tracking.

2. Description of Related Art

Devices incorporating wireless communication approaches including RFID technology are widely used for a variety of different applications, including inventory control, tracking, guard and security systems as well as providing access to services such as access control and loyalty based rewards. Such systems are well known in the retail industry, including in connection with clothing inventory control and security from theft and other losses.

Associating RFID devices with clothing for example worn by humans, the human can cause a reduction in performance of the RFID device enabling the RFID device to only be read in a near field range as opposed to a longer range which of several meters which may be customary with RFID devices that are not interfered with.

RFID devices may have a variety of integrated components, among them a RFID chip containing data such as an identification code for the type of product and even for the exact piece of goods associated with a unique identification code. Other components include an antenna electrically connected to the RFID chip, which is responsible for transmitting signals to and/or receiving signals from another RFID device, for example, a RFID reader system.

In one example, a RFID reader is associated with a point-of-sale location or check-out counter of a retail facility and detects the chip in a tag associated with a particular items such as consumer goods, which can include the register price of that item as well as other details. In another example, an RFID-readable tag is attached to a piece of merchandise or a consumer product in a retail facility, which tags are scanned using an RFID reader to keep proper count of the product inventory and/or to be used as a security measure functioning as a so-called guard tag.

Antennas of this type include dipole form antennas such as those illustrated in FIG. 2 wherein an RFID chip or strap 20 is in electronic communication with a dipole antenna 21 having radiating elements 22, 23 on either side of the chip 20. Each radiating element is configured to facilitate antenna performance.

In some circumstances, the antenna component takes the form of a hybrid loop-slot antenna or slot-loop hybrid antenna, at times referred to as a "sloop" antenna, as shown in FIG. 1. A variation is a hybrid loop-aperture antenna. Configurations of these types of hybrid or sloop antennas are shown in U.S. Pat. No. 7,298,343 and U.S. Pat. No. 8,072,334, incorporated herein by reference in their entirety. It will be appreciated that the slot configurations shown therein may be used as aperture configurations for a conductive sheet.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one embodiment of the present invention a robust RFID device is used in connection with consumers and may be worn or utilized with the garment or apparel item after it has left the retailing or merchandising establishment. For example, a item of clothing such as a uniform could be used to track an individual while performing custodial services and show the location of the individual. In another embodiment, the robust RFID device can be used with a patron of a particular event, such as at a sporting event, concert or the like, thereby enabling the individual to gain entry to the event as well as to make purchases during the event such as food, souvenirs and the like. The robust tag in a still further embodiment could be used for "fast track" or "TSA pre-Check" applications at an airport allowing security personnel to quickly verify data associated with the individual.

In order to work in an improved state in the above-mentioned embodiments, the RFID device can be provided with an additional dielectric material to aid in reducing the interference between the RFID chip/antenna and the individual wearing the garment.

In one aspect, a robust merchandise tag, patch, label, inlay or the like comprises a substrate and an RFID device including a slot-loop hybrid antenna, disposed on the substrate. The RFID device has a large area conductor sheet or foil and an elongated slot fully interior of the conductive sheet except for an open end or branch of the slot. A wireless communication device electronically couples opposing sides of the slot at a first location, a closed end of the slot being at a second location. The sidewalls of the slot define an average slot width, and the large-area conductor sheet extends substantially uninterrupted from the slot sidewalls and the slot closed end to the conductive material peripheral edge for a distance greater than the average width of the slot.

In another aspect, a robust merchandise tag, patch, label, inlay or the like comprises a substrate and an RFID device including a slot-loop hybrid antenna having a large area conductor sheet or foil and an elongated slot fully interior of the conductive sheet except for an open end or branch of the slot. A wireless communication device electronically couples opposing sides of the slot at a first location at the open end of the slot, a closed end of the slot being at a second location. The sidewalls of the slot define an average slot width, and the large-area conductor sheet extends substantially uninterrupted from the slot sidewalls and the slot closed end to the conductive material peripheral edge for a distance greater than the average width of the slot.

In a further aspect, a robust merchandise tag, patch, label, inlay or the like comprises a substrate and an RFID device including a slot-loop hybrid antenna having a large area conductor sheet or foil and an elongated slot fully interior of the conductive sheet except for an open end or branch of the slot. A wireless communication device electronically couples opposing sides of the slot at a first location along the length of the slot between the open end and a closed end of the slot, referred to as a second location. The sidewalls of the slot define an average slot width, and the large-area conductor sheet extends substantially uninterrupted from the slot sidewalls and the slot closed end to the conductive material peripheral edge for a distance greater than the average width of the slot.

In an additional aspect, a robust merchandise tag, patch, label, inlay or the like comprises a substrate and an RFID device including a slot-loop hybrid antenna having a large area conductor sheet or foil and an elongated slot fully interior of the conductive sheet except for an open end or branch of the slot. A wireless communication device electronically couples opposing sides of the slot at a first location, a closed end of the slot being at a second location. The first location and the second location generally coincide with each other. The sidewalls of the slot define an average slot width, and the large-area conductor sheet extends substantially uninterrupted from the slot sidewalls and the slot closed end to the conductive material peripheral edge for a distance greater than the average width of the slot.

In yet an added aspect, a robust merchandise tag, patch, label, inlay or the like comprises a substrate and an RFID device including a slot-loop hybrid antenna having a large area conductor sheet or foil and an elongated slot fully interior of the conductive sheet except for an open end or branch of the slot. A wireless communication device electronically couples opposing sides of the slot at a first location, a closed end of the slot being at a second location. The sidewalls of the slot define an average slot width, and the large-area conductor sheet extends substantially uninterrupted from the slot sidewalls and the slot closed end to the conductive material peripheral edge for a distance at least two times, three times, four times, five times or more greater than the average width of the slot.

DESCRIPTION OF THE ILLUSTRATED EMBODIMENTS

Figure 1:
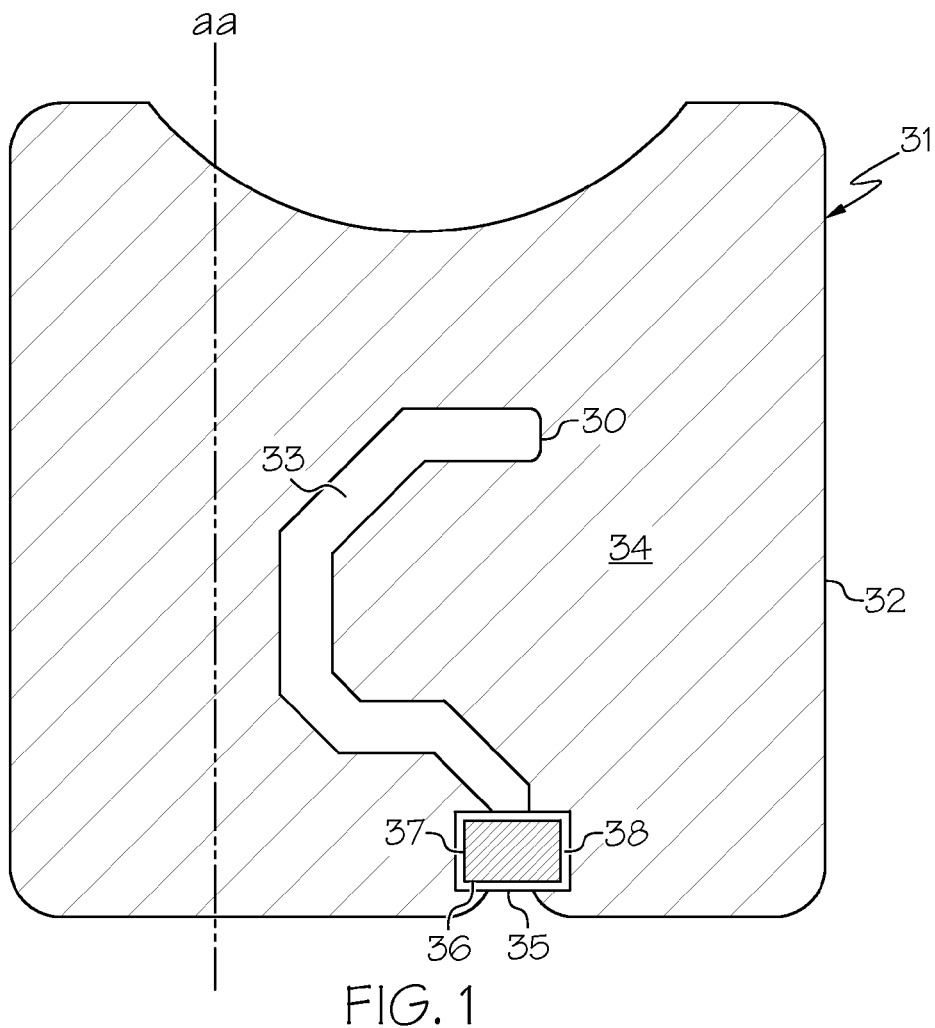
FIG. 1 is a plan view of a hybrid loop-slot or slot-loop hybrid antenna structured in accordance with the present disclosure.

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

The tags disclosed herein are both robust and washable and can have a relatively low thickness. Alternatively, a relatively thin dielectric material can be added to the tag in order to increase performance when the tag is used in an after retail environment.

Tags having these properties, enables the tags to be especially suitable for use as labels, patches, tags, decorative overlays and the like for garments and allows the tag to be worn with the garment relatively comfortably and without notice by the consumer. Garments can be subjected to processing, including washing and so-called "stone washing" during their processing or production. When thus used, the tags are robust and durable, especially with respect to potential breakage of the antenna conductor and can undergo the rigors of such manufacturing and processing. The present RFID tags are capable of withstanding washing and other processes such as stone washing without having to incorporate material that adds excessive thickness, such as overlaminates, which would make the tags stiffer than desired, also likely impacting garment wearability. For example, this form of RFID tag is well suited to inclusion in all forms of patches or other heat applied, sonic applied or adhesive applied structures, such as for example heat transfers or embellishments. The RFID tags are useful as printed fabric labels or other embellishments such as patches and decorative components that are intended to stay with the garment during all stages of manufacture and usage. This allows, inter alia, improved processing and/or inventory control to increase production efficiency.

In addition, the present RFID tags provide enhanced protection against chemical and mechanical damage when incorporated into clothing or other fabric or sheet stock items. Typical examples of processes include washing, dyeing, stone washing and drying. These types of processes are part of the manufacturing process and some or all may continue when the items are in use. The present chips, RFID tags and antenna systems are "packaged" as noted herein.

The present RFID tags address a number of problems. One problem is disruption of the antenna conductor by breakage, tearing or attack by water or other chemical substance to which they are exposed during manufacturing, processing and use. Another problem that is addressed is the disruption of the joint or connection between the antenna and the RFID chips. In some cases, a strap or interposer is used, and the present approach addresses the problem of damage to the connection between the RFID chip and the strap, as well as damage to the connection between the strap and antenna joints. Furthermore, the present approach addresses physical damage to the RFID chip, such as cracking or crushing of the silicon (chip) structure. The various structures disclosed herein are effective in reducing the above-noted problems and damages.

FIG. 1 illustrates an RFID device, generally designated as 31, which includes an antenna 32 that is of the hybrid loop-slot antenna type, generally referred to as a "sloop" antenna. The illustrated RFID device has a slot 33 that is located fully in the interior of a large-area conductor sheet 34 that is made of electrically conductive material. This is to be as thin as possible and may be conductive foil for example, e.g. aluminum, copper, etc. As illustrated, slot 33 has a closed end 30 and is fully contained within the large-area conductor sheet 34, with the exception that slot 33 has an open end 35 that is neither closed by nor short-circuited with respect to the conductor sheet 34. Slot 33 can be cut from the sheet of conductive material of the conductor sheet 34 at various locations such as shown in the present drawings, with other configurations being available provided the large-area features herein are maintained. Cutting can be accomplished via mechanical die cutting, laser cutting or any other suitable means to cut and then remove the unwanted material.

A wireless communication device 36, typically an RFID chip, is electrically coupled to the conductor sheet. In the embodiment illustrated in FIG. 1, this wireless communication device 36 is electrically coupled to or by way of respective points that are generally called out at 37, 38 at locations at which the wireless communication device is in operative electrical engagement with the large-area connector sheet 34. In this particular embodiment, points 37, 38 are on opposing sides of the slot closely spaced from the open end 35 of the slot. RFID chips can be variously configured, for example including an integrated circuit for controlling RF communication and other functions of the tag.

It will be appreciated from FIG. 1 that, with this form of antenna, there is a large proportion of the surface area covered by the conductor. Thus, the length of the area between the slot 33 and the conductor sheet perimeter is greater than the slot width, except at slot open end 35. This greater length is at least two times, three times, four times, five times, six times, seven times, eight times, nine times, ten times or more than the slot width at its exterior. This has proven to be resistant to damage in the following ways.

Figure 2:
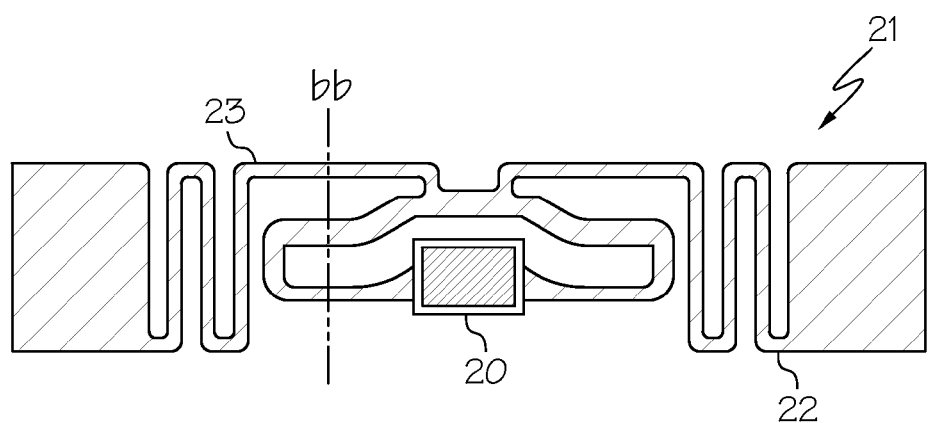
FIG. 2 is a plan view of a prior art dipole-form antenna illustrating a property of same.

Large-area conductor sheet 34 is much more difficult to break than a thin line or other structure in typical dipole form antennas 21 such as illustrated in FIG. 2. Breakage of the antenna conductor is less likely to cause a critical reduction in antenna and hence RFID tag performance. For example, disconnection of the section denoted by line "aa" in FIG. 1 will result in somewhat reduced performance; however, the RFID tag device will continue to operate. A similar disconnection when the dipole form antenna denoted by line "bb" illustrated in FIG. 2. This would sever or at least severely damage one of the radiating elements 23, making that RFID tag potentially inoperative particularly in far field environments.

Figure 5:
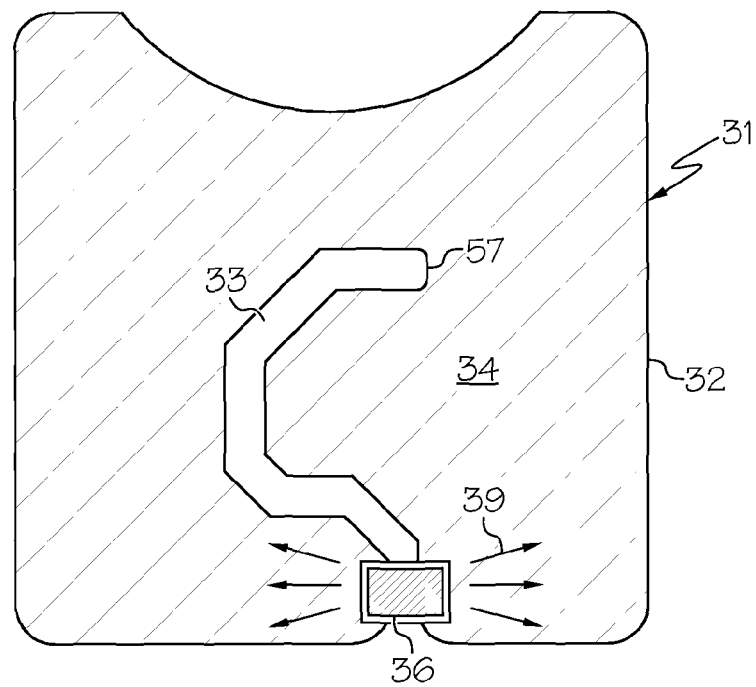
FIG. 5 is a plan view of an RFID tag according to the present disclosure that illustrates a hybrid loop-slot antenna advantageous property.

Another advantage of the structure illustrated in FIG. 1 is depicted in FIG. 5. With the chip or interposer or wireless communication device 36 coupled to the antenna 32, the large-area conductor sheet 34 serves to stiffen and protect the critical joint between the wireless communication device and the antenna. For example, potentially destructive forces in the nature of stress or strain illustrated by arrows 39 are dissipated into the large area of the conductor sheet 34. It can be considered that these forces tend to emanate from the points of electrical coupling between the illustrated RFID device 36 and the connector sheet 34 of the antenna 32.

Figure 3:
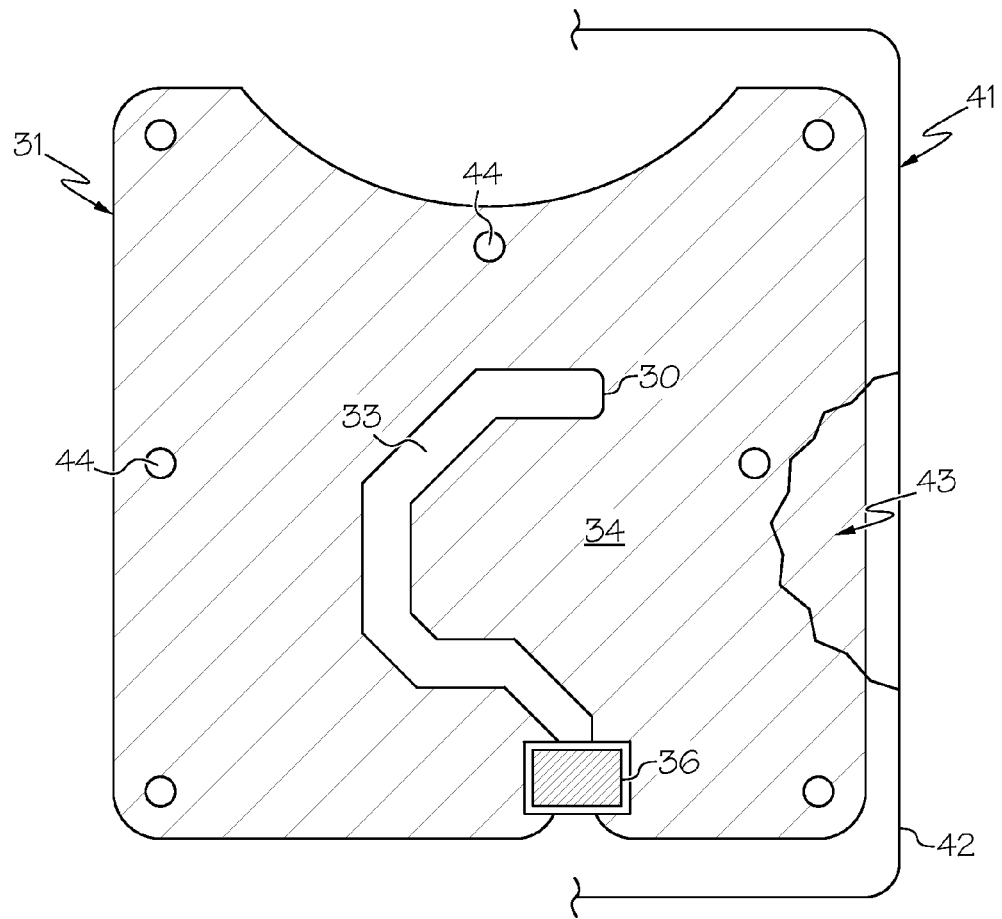
FIG. 3 is a plan view of a robust merchandise tag, partially broken away, with antenna being an embodiment according to the present disclosure.

A robust merchandise tag 41 of the present disclosure includes some form of overlamination 42, as schematically illustrated in partial form in FIG. 3. This overlamination 42 protects the wireless communication device 36 and can protect some or all of the antenna 32 or just over portions of the chip/antenna connection area. When desired, the overlamination 42 fully encapsulates the conductor 34 and its associated components including the slot 33 and the wireless communication device 36, as well as whatever feature is used to electrically couple the wireless communication device and the conductor sheet together. The overlamination 42 can flow or mold into any gaps. Examples of the overlamination material include a polyethylene terephthalate ("PET") film attached by any suitable approach, sealant, adhesive, heat, pressure and/or sonic sealing or the like that will prevent or substantially reduce the ability of water or chemical agents, including detergents and processing chemicals, from compromising the overlamination, resulting in damage to the robust merchandise tag, such as conductor corrosion. Typically the overlayer will be a polymer that provides the needed resistance to unwanted incursion of outside elements into the tag.

Despite the objective of avoiding such unwanted incursions, one cannot be certain that such incursions will be totally eliminated. In that event, the present robust merchandise tags exhibit the following advantage. For example, if over time a chemical agent or water ingresses into the edge of the inlay, conductor corrosion will occur. FIG. 3 illustrates this form of corrosion or damage, generally designated at 43. As thus illustrated, the structure of the antenna is such that a large area must experience such damage before the robust merchandise tag becomes inoperative.

Figure 4:
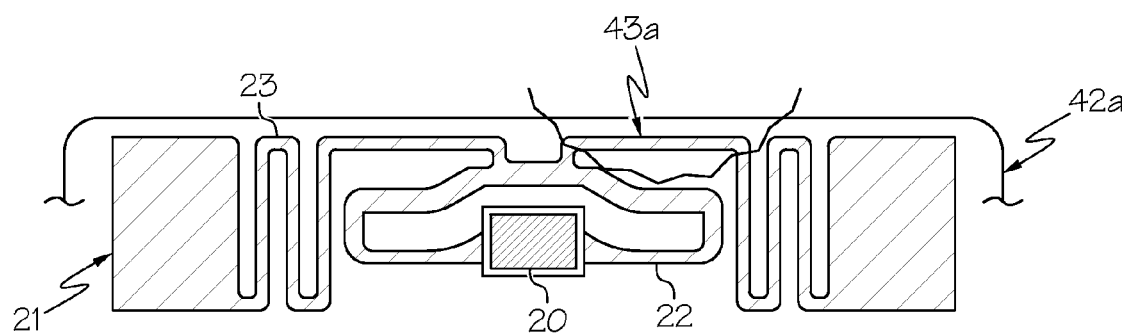
FIG. 4 is a plan view of a merchandise tag, partially cut away, having prior art dipole-form antenna illustrating a property of same.

FIG. 4 illustrates a prior art antenna, the dipole antenna 21 protected by an overlamination 42a. When that overlamination is compromised by corrosion or damage generally designated at 43a, this antenna 21 suffers a critical failure when subjected to the same degree of damage ingress illustrated at 43. As illustrated, one of the radiating elements or lines 22 is damaged by ingress 43a, resulting in disconnection of one of the lines or radiating elements 22.

Figure 6:
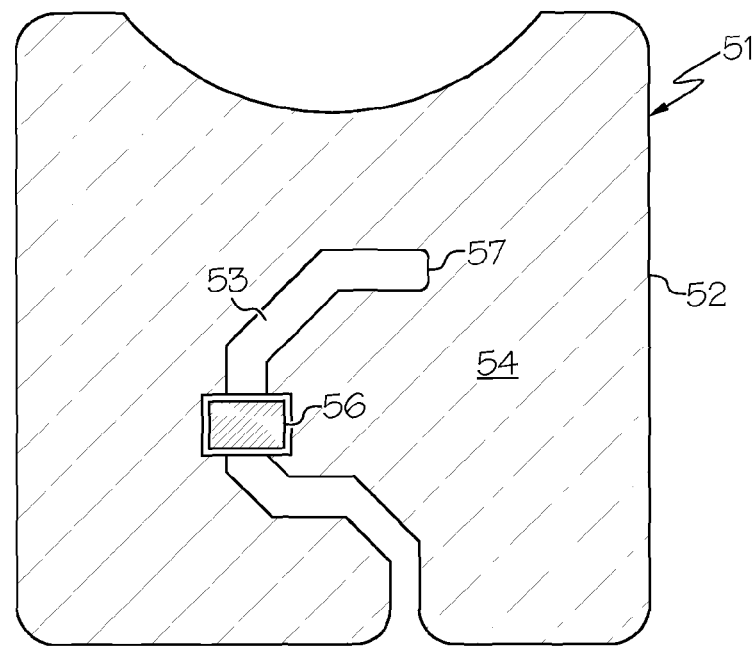
FIG. 6 is a plan view of a further embodiment of a slot-loop hybrid antenna according to the present disclosure.

The RFID device generally designated as 51 in FIG. 6 shows an alternate arrangement for placement of the wireless communication device 56, typically an RFID chip, at a different location along slot 53 having a closed end 57. The wireless communication device 56 is electrically coupled to the connector sheet 54 substantially in the same manner as described in the other embodiments herein. With this FIG. 6 embodiment, an RFID chip and/or strap is positioned to a more central position within the antenna structure, when compared with that of FIG. 1. This and other embodiments illustrate the great deal of flexibility as to where the strap coupling position to the aperture in the conductor is made, as well as where the aperture or slot is located. This allows the device designer to tailor these elements and their respective locations in order to achieve both good radio frequency ("RF") performance and maximum protection to the RFID device and its connection to the antenna.

Figure 7:
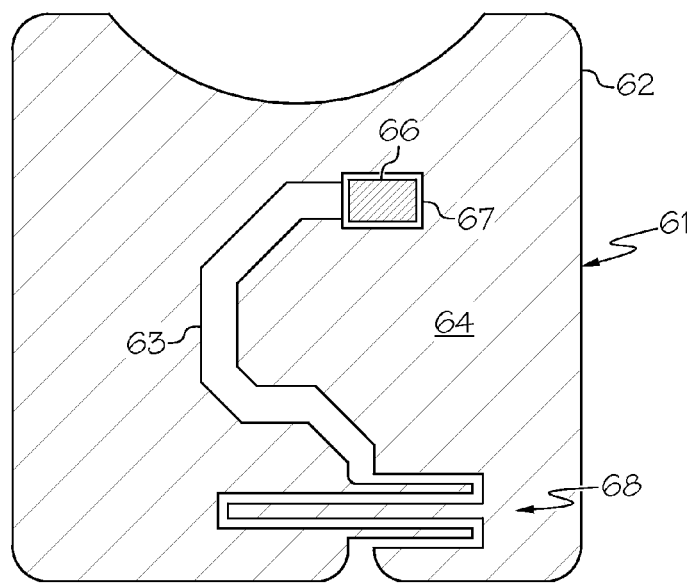
FIG. 7 is a plan view of another embodiment of a hybrid loop-slot antenna according to the present disclosure.
Figure 7A:
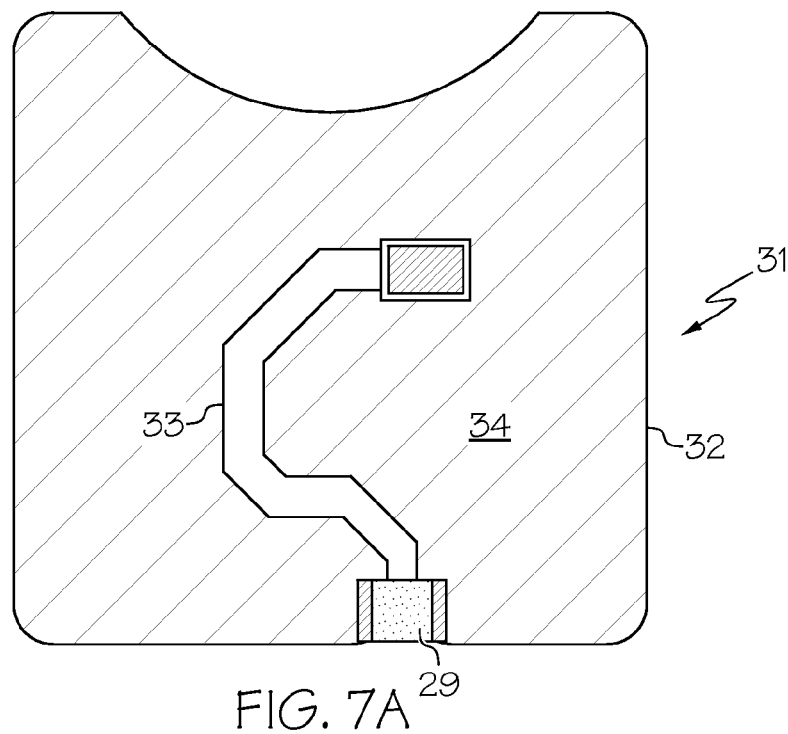
FIG. 7A is a plan view of another embodiment of a loop-slot antenna with an additional capacitive element to establish tuning.

The embodiment of FIG. 7 illustrates a further alternative embodiment of an RFID device generally designated at 61. In this arrangement, antenna 62 has a wireless communication device 66, or reactive strap or RFID chip coupled to the closed end 67 of the slot or aperture 63 formed in the large-area conductor sheet 64. There is a strong magnetic field element at this location. However, to establish the tuning of the antenna, capacitance is required near the slot or aperture; this is created by using an inter-digital structure, such as the inter-digital capacitor generally designated at 68 in FIG. 7. Alternatively, a capacitive component, such as a ceramic chip capacitor 29 can be used to establish the tuning as shown in FIG. 7(a).

Figure 7B:
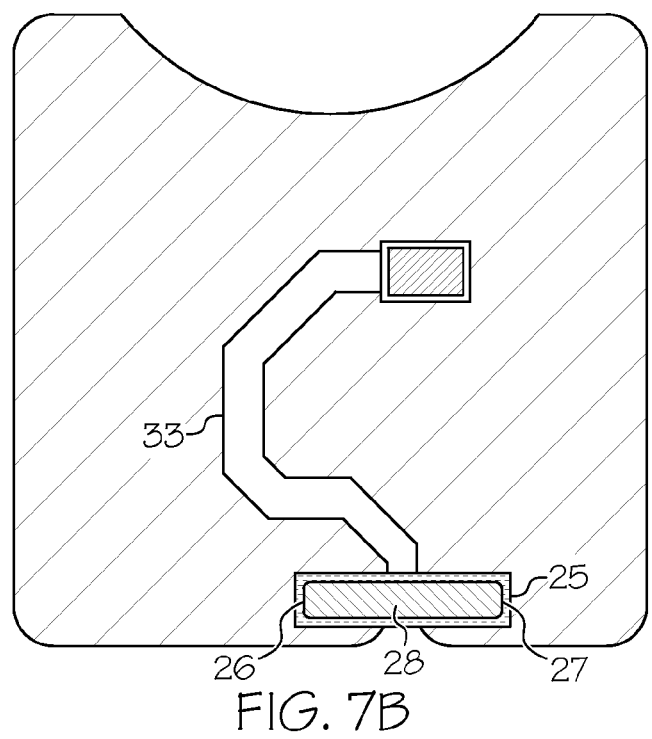
FIG. 7B is a plan view of another embodiment of a loop-slot antenna showing a bridging element.

In another embodiment, the required capacitance can be achieved by using a bridging element 28 of a suitable conductor such as aluminium foil, separated by a dielectric 25 from the conductive material on either side of the aperture 33, forming two parallel plate capacitors, 26, 27 in series. In a preferred embodiment, the dielectric is an adhesive 25 printed or coated with a controlled thickness or foam material which may be attached via an adhesive. This particular embodiment is illustrated in FIG. 7(b).

In a further alternative embodiment, the wireless communication device can be an RFID chip in a "package." Examples of such packages are those supplied by Hitachi Chemical Co., Ltd., such as the Type No. IM5-PK2525. Many such packaged devices add a level of robustness, especially when combined with the robustness of the antenna structure described herein. This combination provides a very strong and robust structure suitable for the most extreme forms of fabric preparation, such as stone washing during processing when manufacturing denim items such as pants, jackets, shirts and the like.

Figure 8:
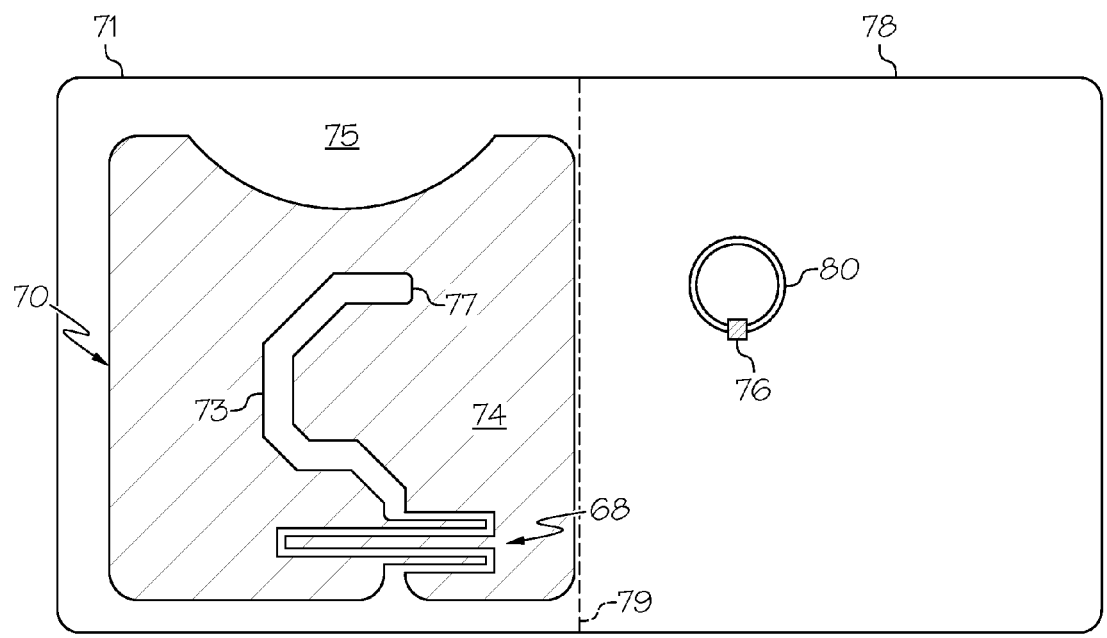
FIG. 8 is a plan view of an in-process merchandise tag according to a further embodiment of the present disclosure.
Figure 9:
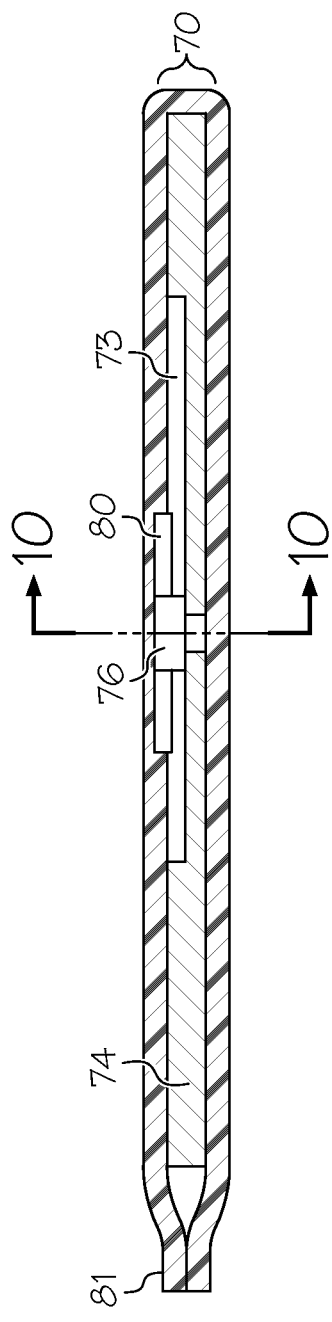
FIG. 9 is an elevation end view of the embodiment of FIG. 8, shown in its assembled condition.
Figure 10:
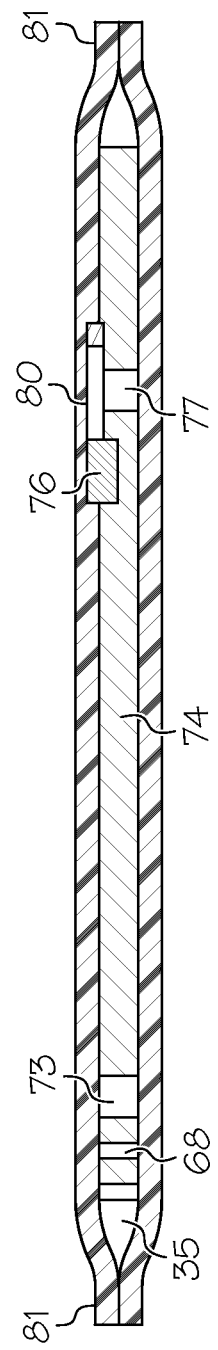
FIG. 10 is a cross-section through the embodiment of FIG. 9 along the line 10-10.

A further embodiment is illustrated in FIG. 8, FIG. 9 and FIG. 10. In these figures, a separate element is formed on the antenna substrate adjacent to the antenna substrate. This illustrated robust merchandise tag is generally illustrated as 71 and includes an RFID device generally designated as 70 and shown in an unassembled or condition or more particularly in a state which requires further conversion such as by a label or tag converter to form a finished tag or label in FIG. 8 and in an assembled condition in FIG. 9 and FIG. 10 when the substrate is formed into a finished label or tag that can then be attached to a garment, apparel item, accessory or the like. A fold-over portion 78 supports the wireless communication device 76, which is positioned thereon, such that when the fold-over portion is folded along a line generally illustrated by fold line 79, alignment achieving proper coupling position is attained. The fold-over portion 78 can be a continuation of, or a separate component from overlamination 75. When folded over and secured together as shown in FIG. 9 and FIG. 10, the fold-over portion 78 results in the antenna 72 being sandwiched between an additional layer of protective material. When, as shown in FIG. 8, FIG. 9 and FIG. 10, the fold-over portion 78 and overlamination 75 are of substantially the same size, an especially secure pocket or sandwich is provided after folding over and after securing together the overlamination and fold-over portion, such as at 81. As used herein, the substrate on which the antenna is provided may be paper, plastic, fabric or any other suitable material that could be included in a garment or apparel item.

A further embodiment is illustrated in FIG. 8(a). Here the additional tuning element 82 at the aperture of the slot 33 is made using a bridge 82, carried on the section of material 78 designed to be folded onto the antenna 34, which also carries a coupling element, such as a reactive strap 80. The antenna 34 is coated with an adhesive 83 of defined thickness and properties so that in the folded state the capacitance formed by the bridging element 82 is defined, as well as the coupling between the reactive strap 80 and the antenna 34, either in the form of the magnetic loop as illustrated, a component such as the Hitachi packaged chip or an element designed to be coupled capacitively.

With more particular reference to this embodiment depicted in FIG. 8, the illustrated wireless communication device 76, such as a strap or RFID chip that is a separate element in this embodiment prior to fold over, includes a magnetic loop 80. Placement of the magnetic loop element is such that when fold over is completed, the magnetic loop and wireless communication device 76 fold in toward the center of the antenna 72, positioning the magnetic loop and RFID device or the like adjacent to the desired coupling position on the antenna. In the illustrated embodiment shown in the drawings, the coupling position is in the vicinity of the closed end 77 of the slot 73 within the large-area conductor sheet 74. When desired, the overlamination 75 and fold-over portion 78 can be joined together by any suitable mechanism such as heat sealing, sonic welding, lamination or adhesive use in order to form a sealed edge 81 as illustrated in FIG. 9 and FIG. 10.

Figure 11:
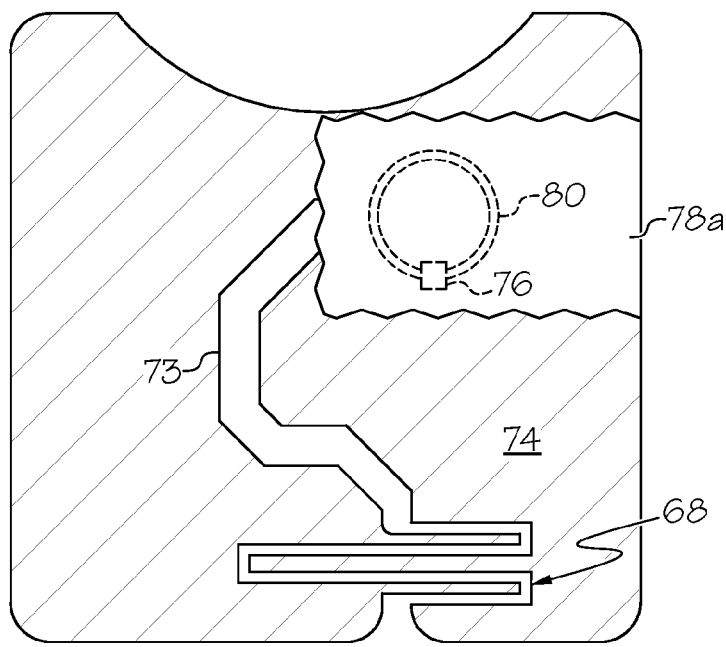
FIG. 11 is a plan view of another embodiment of a merchandise tag with an RFID device of the present disclosure.

A further embodiment is illustrated in FIG. 11, wherein the fold-over portion 78a is considerably smaller in area than the large-area conductor sheet 74. The resulting fold-over tab 78a still performs the function of sandwiching the magnetic loop 80 and wireless communication device 76 between the tab and a portion of the area of the conductor sheet 74. In the illustrated arrangement, the tab 78a secures onto the conductor sheet 74 with no overlamination being shown. When desired this may be combined with an overlamination element as in FIGS. 8, 9 and 10.

Figure 12:
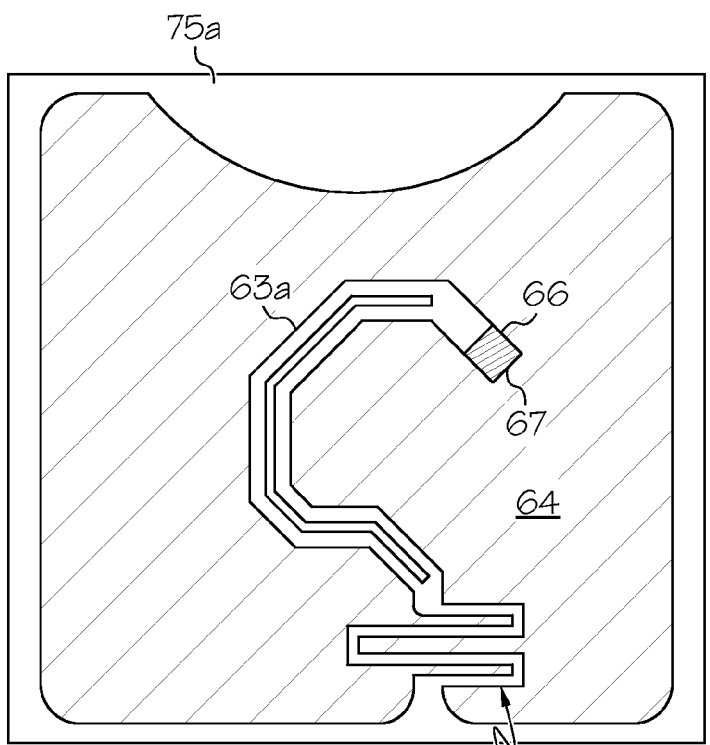
FIG. 12 is a plan view of an embodiment of an antenna according to the present disclosure with its over-laminated structure merchandise tag.

FIG. 12 illustrates an embodiment similar to that of FIG. 7. In this arrangement, the interior of the slot 63a is shown in a narrowed form when compared with that shown in FIG. 7. FIG. 12 shows a laser-cut antenna with an interdigital capacitor 68 to establish initial tuning. Another embodiment is to provide an etched antenna, which can have the advantage of being more precise in the capacitor section, making the device smaller. If desired, this also would allow a somewhat thicker large-area conductor sheet.

Figure 13:
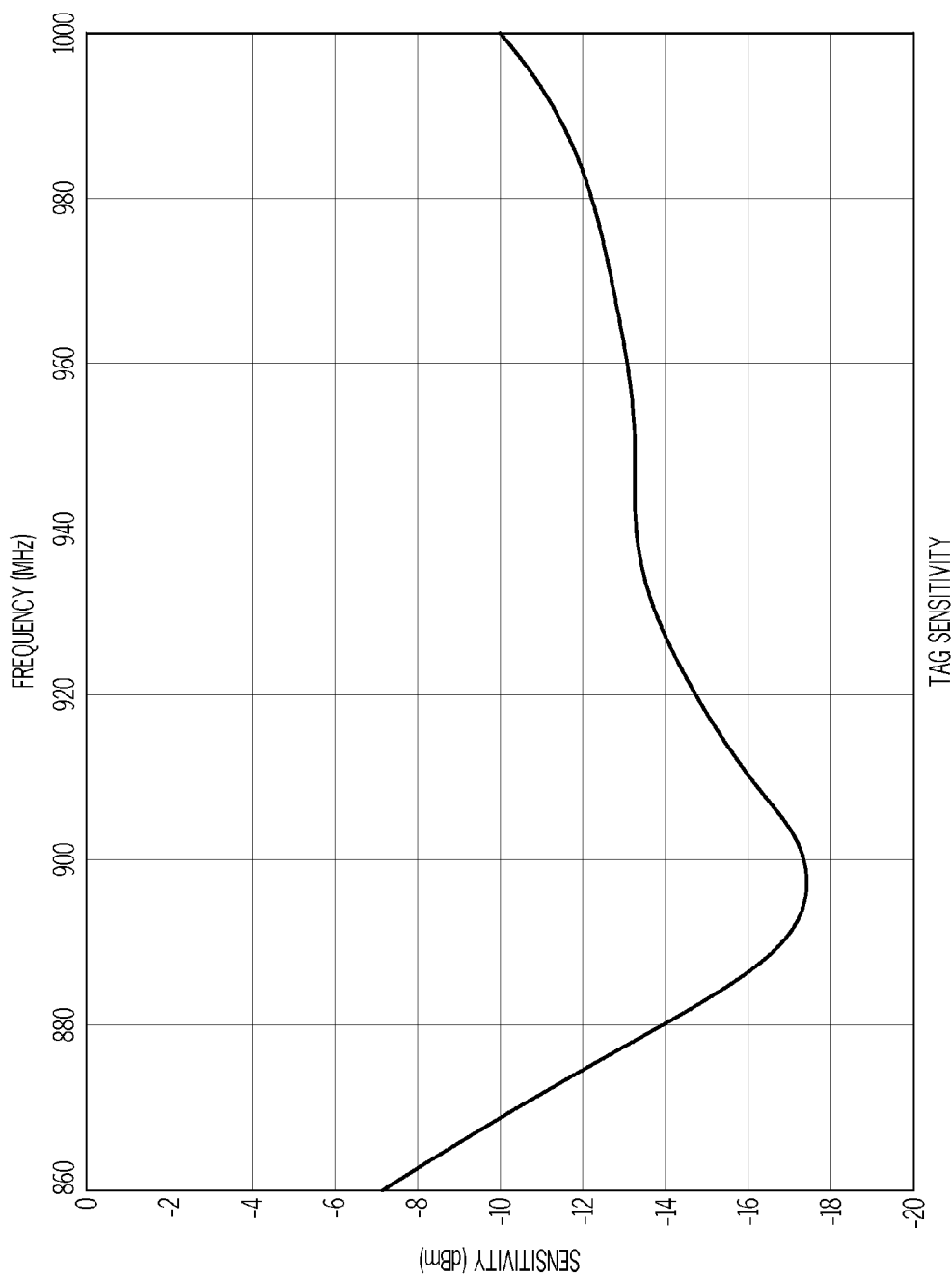
FIG. 13 is a plot showing sensitivity versus frequency for the merchandise tag and antenna configuration illustrated in FIG. 12.

FIG. 13 is a plot of data generated when testing the robust merchandise tag depicted in FIG. 12. This plot shows sensitivity versus frequency for that particular embodiment, showing the sensitivity (gain) versus frequency of this antenna, which was 47 mm$^2$. This performance testing averaged −15 dBm sensitivity in the U.S. band. In addition, this showed signs of a broad band response, not always a characteristic of a slot-loop hybrid (sloop) antenna. Also, the device of FIG. 12 included a hot melt overlaminate and a packaged Hitachi reactively coupled M5 chip.

Figure 14:
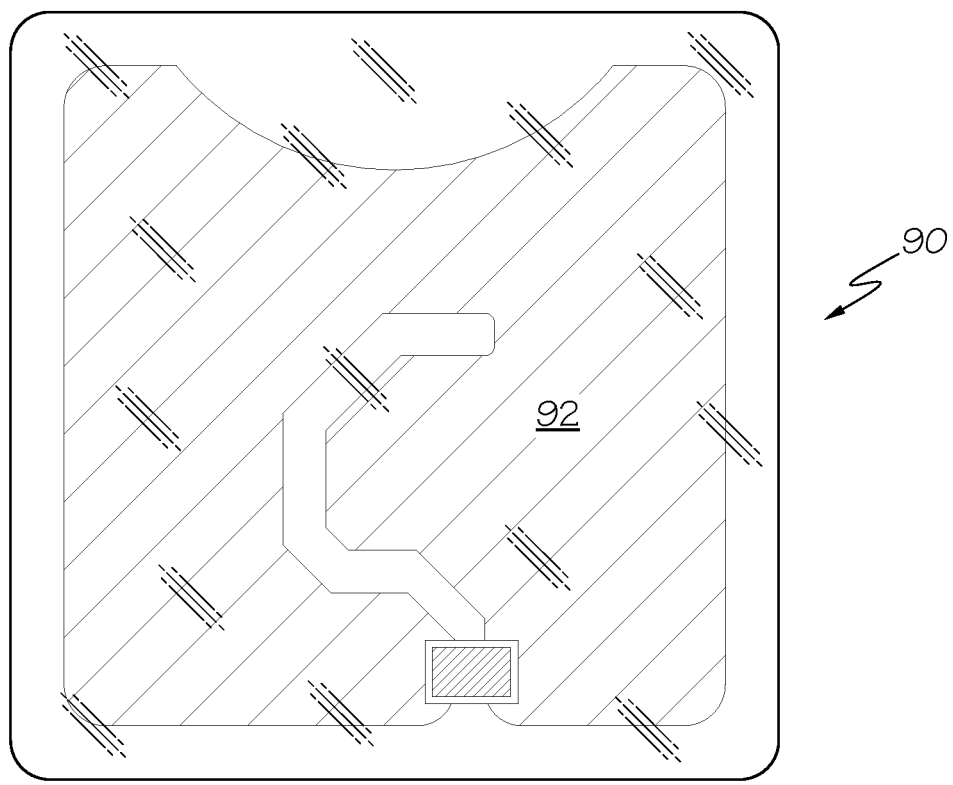
FIG. 14 is a plan view of an embodiment of an antenna according to the present invention with an additional dielectric layer.
Figure 14A:
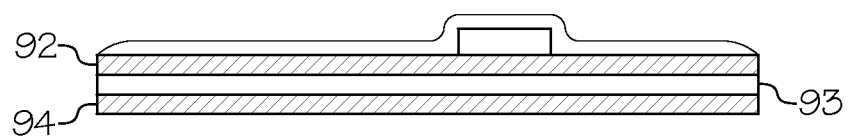
FIG. 14A is a side elevation view of FIG. 14.

FIGS. 14 and 14A shows a still further alternate embodiment. For some applications, it is desirable that the RFID device incorporated into a piece of clothing or other item operates when the item is being worn; for example, in the case of decorative patch on a sport shirt, the tag may function as an identification of the loyalty of the person wearing it and allow then access to premium services at a sporting venue, such as discounts on food and drink, access to VIP areas etc. It is known that people, due to their structure, being largely compromised of water and other RF adsorbing materials, interfere with the operation of UHF RFID devices when in proximity, reducing the range. The form of antenna used in the previous embodiments is also able to operate in close proximity to an additional metallic plane, frequently described as a 'ground plane'. This plane, between the RFID antenna and the surface that would be in proximity to the person when a garment is being worn mitigates the effect of the person on the range of the RFID tag.

In FIG. 14 and FIG. 14A one embodiment of the structure 90, described above, is shown, although it will be appreciated that any of the structures previously described can be used to form a surface insensitive tag structure with appropriate design modifications. The RFID antenna 92 is separated from the conductive plane by a thin dielectric layer 93. The dielectric layer may be attached to a substrate by an adhesive layer 94. In this context, thin would described layer less than one percent (1%) of the wavelength of the RFID frequency being used to interrogate the RFID device, although thicker layers may be used to give greater performance, but may reduce the wearability of the garment. The dielectric layer 93 maybe any material that is both flexible, durable and of a low dielectric constant, defined as a layer with a relative dielectric constant of less than four (4). Examples of suitable materials would be closed cell polypropylene foams, fabrics, treated paper, synthetic paper, meshes of polymer fibers and films such as PET.

The robust merchandise tags, devices and antennas described herein are particularly suitable for inclusion into external embellishments or patches or labels attached to clothing, apparel accessories or bendable items, same being robust without adding excessive thickness. There is no joint or connection that can break, and substantial force would be needed to smash or damage the packaged chip and tag as disclosed herein so as to make it inoperable. In order to facilitate attachment to clothing and the like, the device can include a series of apertures 44 (illustrated in FIG. 3) through the large-area conductor sheet 34 without significantly affecting performance. Such apertures, in the case of a heat-applied patch or tag or label, allow adhesive used such as a hot melt to flow through the antenna, preventing bulges of air pockets and making the structure more robust. In such an instance, the patch, tag, label or the like bonds directly to the fabric rather than by way of the structure of the merchandising tag itself. The attachment may be made by sewing, stitching, plastic fasteners, adhesive or any other suitable means by which to attach the tag to the garment.

A typical large-area conductor sheet will be made of a material that is electrically conductive and that is advantageously thin for use as a component of a garment or the like. Typically, such materials can be considered to be foils of a type generally known in the art. The conductor sheet needs to be able to withstand multiple bending motions that would be encountered during the types of processing and handling that is illustrated herein. Alternatively, other forms of conductor can be used, such as those described as conductive fabrics, made of either a conductive wire mesh or elements such as polymer thread coated with metal and then woven into an overall conductive structure.

Other embodiments, besides those illustrated herein, may also be employed without departing from the scope of the present disclosure. For example, other means for attaching the device to a garment or other fabric or otherwise bendable material can be employed, such as sewing, brads or other connection mechanisms. Advantageously, the antenna structure is able robust against the damage caused by operations such as sewing into the garment, as the holes created will not cause disconnections of antenna elements as would be the case with prior art dipole type antennas. Further, other configurations of the slot itself may be employed, with the proviso that the slot is to be adequately protected by a significantly large area of the conductor sheet except at the slot open end.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A robust merchandise tag having a RFID device for wireless communication and a slot-loop hybrid antenna, the robust tag comprising:
    a large-area conductor sheet of electrically conductive material having a perimeter edge, an elongated slot of a slot-loop hybrid antenna positioned fully within an interior of the conductor sheet except for a slot open end not short-circuited with respect to the conductor sheet;
    a wireless communication device having a pair of contact points electrically coupled to respective parts of the conductor sheet, the points being on opposing sides of the slot at a first location with respect to the slot;
    a second location of the conductor sheet and slot providing a closed end of the slot;
    said slot has generally opposing sidewalls defining therebetween an average slot width;
    said large-area conductor sheet extends substantially uninterrupted from the slot sidewalls and the slot closed end to the conductive material perimeter edge for a distance greater than the average width of the slot; and
    an overlayer that overlies the entirety of the wireless communication device and at least a portion of the large-area conductor sheet adjacent the wireless communication device.

2. The robust merchandising tag in accordance with claim 1, wherein said first location is at said open end.

3. The robust merchandising tag in accordance with claim 1, wherein said first location is along a length of the slot between the open end and closed end of the slot.

4. The merchandising robust tag in accordance with claim 1, wherein said first location and said second location generally coincide with each other.

5. The robust merchandising tag in accordance with claim 1, wherein said distance of the conductor sheet is equal to or greater than two times the average width of the slot.

6. The robust merchandising tag in accordance with claim 1, wherein said distance of the conductor sheet is equal to or greater than three times the average width of the slot.

7. The robust merchandising tag in accordance with claim 1, wherein said distance of the conductor sheet is equal to or greater than four times the average width of the slot.

8. The robust merchandising tag in accordance with claim 1, wherein said distance of the conductor sheet is equal to or greater than five times the average width of the slot.

9. The robust merchandising tag in accordance with claim 1, wherein said elongated slot is a non-linear slot.

10. The robust merchandising tag in accordance with claim 1, wherein said tag is a patch, a label, a fabric, a garment or combinations thereof.

11. The robust merchandising tag in accordance with claim 1, wherein the overlayer overlies the entire surface area of the conductor sheet on which the wireless communication device is located.

12. The robust merchandising tag in accordance with claim 1, wherein the overlayer fully encapsulates the large-area conductor sheet and the wireless communication device.

13. A robust merchandising tag having a RFID device for wireless communication, comprising:
   a RFID wireless communication device having a chip;
   a large-area conductor sheet having a perimeter edge;
   a slot-loop hybrid antenna having an elongated slot positioned fully within an interior of the conductor sheet except for a slot open end not short-circuited with respect to the conductor sheet;
   the wireless communication device being electrically coupled to the conductor sheet at a first location with respect to the slot;
   a second location of the conductor sheet and slot providing a closed end of the slot;
   said slot has generally opposing sidewalls defining therebetween an average slot width;
   said large-area conductor sheet extends substantially uninterrupted from the slot sidewalls and the slot closed end to the conductive material perimeter edge for a distance greater than the average width of the slot; and
   an overlayer that overlies the entirety of the wireless communication device and at least a portion of the large-area conductor sheet adjacent the wireless communication device.

14. The robust merchandising tag of claim 13, further including a chip capacitor to facilitate tuning of the merchandising tag.

15. The robust merchandising tag of claim 13, further including a bridge for tuning the merchandising tag.

16. The robust merchandising tag of claim 13, further including a dielectric layer between the conductor sheet and the overlayer.

17. The robust merchandising tag of claim 16, wherein the dielectric layer is attached by an adhesive.

18. The robust merchandising tag of claim 16, wherein the dielectric layer is selected from a group including foam, adhesive, film or fabric.

19. A garment having a robust tag having a RFID device for wireless communication secured thereto, comprising:
   A RFID wireless communication device having a chip;
   a large-area conductor sheet having a perimeter edge;
   a slot-loop hybrid antenna having an elongated slot positioned fully within an interior of the conductor sheet except for a slot open end not short-circuited with respect to the conductor sheet;
   the wireless communication device being electrically coupled to the conductor sheet at a first location with respect to the slot;
   a second location of the conductor sheet and slot providing a closed end of the slot;
   said slot has generally opposing sidewalls defining therebetween an average slot width;
   said large-area conductor sheet extends substantially uninterrupted from the slot sidewalls and the slot closed end to the conductive material perimeter edge for a distance greater than the average width of the slot;
   an overlayer that overlies the entirety of the wireless communication device and at least a portion of the large-area conductor sheet adjacent the wireless communication device; and
   a fabric component to which the robust tag is secured.

20. The garment according to claim 19, wherein the robust tag is a label, patch or decorative element.

* * * * *